US007391423B1

(12) United States Patent  
Manzari et al.

(10) Patent No.: US 7,391,423 B1
(45) Date of Patent: Jun. 24, 2008

(54) THUMBNAIL SCALING BASED ON DISPLAY PANE SIZE

(75) Inventors: Johnnie B Manzari, San Francisco, CA (US); Claire Schendel, Petaluma, CA (US)

(73) Assignee: Adobe Systems Incorporated, San Jose, CA (US)

( * ) Notice: Subject to any disclaimer, the term of this patent is extended or adjusted under 35 U.S.C. 154(b) by 554 days.

(21) Appl. No.: 10/960,636

(22) Filed: Oct. 6, 2004

(51) Int. Cl.
*G09G 5/00* (2006.01)

(52) U.S. Cl. ........................................ 345/619; 715/764
(58) Field of Classification Search ................. 345/800, 345/147
See application file for complete search history.

(56) References Cited

U.S. PATENT DOCUMENTS

| | | | | |
|---|---|---|---|---|
| 5,987,345 | A * | 11/1999 | Engelmann et al. | 600/407 |
| 6,333,752 | B1 * | 12/2001 | Hasegawa et al. | 715/764 |
| 6,411,274 | B2 * | 6/2002 | Watanabe et al. | 345/684 |
| 6,456,305 | B1 * | 9/2002 | Qureshi et al. | 715/800 |
| 6,825,860 | B1 * | 11/2004 | Hu et al. | 715/801 |
| 6,906,710 | B2 * | 6/2005 | Matsuzaki et al. | 345/419 |
| 2002/0005818 | A1 * | 1/2002 | Bruzzone | 345/6 |
| 2002/0080150 | A1 * | 6/2002 | Nakatani | 345/660 |
| 2002/0135621 | A1 * | 9/2002 | Angiulo et al. | 345/838 |
| 2002/0154123 | A1 * | 10/2002 | Harasimiuk | 345/472 |
| 2002/0191031 | A1 * | 12/2002 | Ricard | 345/838 |
| 2003/0016248 | A1 * | 1/2003 | Hayes Ubillos | 345/800 |
| 2003/0018427 | A1 * | 1/2003 | Yokota et al. | 701/208 |
| 2003/0067627 | A1 * | 4/2003 | Ishikawa et al. | 358/1.15 |
| 2003/0222889 | A1 * | 12/2003 | Parulski et al. | 345/619 |
| 2004/0017394 | A1 * | 1/2004 | Adachi | 345/744 |
| 2005/0097475 | A1 * | 5/2005 | Makioka et al. | 715/792 |
| 2005/0213839 | A1 * | 9/2005 | Kita | 382/254 |
| 2007/0250788 | A1 * | 10/2007 | Rigolet | 715/788 |

FOREIGN PATENT DOCUMENTS

| | | | |
|---|---|---|---|
| JP | 2000331179 A | * | 11/2000 |
| JP | 2004012633 A | * | 1/2004 |

OTHER PUBLICATIONS

"Using Adobe Photoshop 5", by Giordan et al. published in Indianapolis by Que, 1998, pp. i, 81-83.*

* cited by examiner

*Primary Examiner*—Doug Hutton
*Assistant Examiner*—Gregory A DiStefano
(74) *Attorney, Agent, or Firm*—Fish & Richardson P.C.

(57) ABSTRACT

Methods and apparatus for thumbnail scaling based on display pane size. A computer-implemented method includes displaying a display pane and an image scaling tool on a display device. The display pane is subject to resizing and is displayed at a current width and height. The image scaling tool has two or more selectable positions. The method includes receiving one or more thumbnails. The method includes designating one of the thumbnails to be a reference thumbnail. The reference thumbnail is an image having a particular aspect ratio. The method includes calculating a maximum display width and height at which the reference thumbnail, without being cropped or having its aspect ratio altered, can fit in the display pane. The method includes calculating, for a first of the selectable positions, a target display width and a target display height, the calculation being based on the maximum display width height of the reference thumbnail.

30 Claims, 10 Drawing Sheets

FIG. 11 ized pixels. For thumbnails
THUMBNAIL SCALING BASED ON DISPLAY PANE SIZE

BACKGROUND

The present invention relates to digital image processing.

A thumbnail is a digital image that is usually but need not be static. Thumbnails are usually displayed at a small size so that more than one can fit in a display area of a display device. A size of a displayed thumbnail is the spatial extent of the display area consumed by the thumbnail. Display size is typically measured in units of squared pixels. For thumbnails that are rectangular in shape, the size of the displayed thumbnail is calculated by taking the product of its height and width, both usually measured in units of pixels.

A rectangular thumbnail has an inherent aspect ratio, which is the ratio of the width and the height of the thumbnail. The inherent aspect ratio of a thumbnail is generally determined by the application and/or device that generated the thumbnail. A rectangular thumbnail can be displayed at an aspect ratio that is different than its inherent aspect ratio by, for example, cropping or uneven scaling of its height and width.

Aspect ratio is generally described as either width to height or, alternatively, width:height. A thumbnail having, for example, a displayed height and width of 400 pixels by 300 pixels, respectively, has a display aspect ratio of 4 to 3 or simply 4:3.

An application that displays thumbnails usually provides an image scaling tool that can be used to change the display size of the thumbnails. The scaling tool typically includes multiple positions. The selection of a position scales the thumbnails to a target display height and a target display width that are associated with the position.

SUMMARY

The present invention provides methods and apparatus, including computer program products, for thumbnail scaling based on display pane size.

In one general aspect, the invention features a computer-implemented method that includes displaying a display pane and an image scaling tool on a display device. The display pane is subject to resizing and is displayed at a current width and a current height. The image scaling tool has two or more selectable positions. The method includes receiving one or more thumbnails. The method includes designating one of the one or more thumbnails to be a reference thumbnail. The reference thumbnail is an image having a particular aspect ratio. The method includes calculating a maximum display width and maximum display height at which the reference thumbnail, without being cropped or having its particular aspect ratio altered, can fit in the display pane being displayed. The method includes calculating, for a first of the two or more selectable positions of the image scaling tool, a target display width and a target display height, the calculation being based on the maximum display width and maximum display height of the reference thumbnail. The method includes associating the target display width and the target display height with the first position, wherein selection of the first position scales the thumbnails to be displayed at the target display width and the target display height. The method includes recalculating the target display width and the target display height whenever the width or the height of the display pane being displayed changes.

In another general aspect, the invention features a computer-program product that includes instructions to display a display pane and an image scaling tool on a display device. The display pane is subject to resizing and is displayed at a current width and a current height. The image scaling tool has two or more selectable positions. The product includes instructions to receive one or more thumbnails. The product includes instructions to designate one of the one or more thumbnails to be a reference thumbnail. The reference thumbnail is an image having a particular aspect ratio. The product includes instructions to calculate a maximum display width and maximum display height at which the reference thumbnail, without being cropped or having its particular aspect ratio altered, can fit in the display pane being displayed. The product includes instructions to calculate, for a first of the two or more selectable positions of the image scaling tool, a target display width and a target display height, the calculation being based on the maximum display width and maximum display height of the reference thumbnail. The product includes instructions to associate the target display width and the target display height with the first position, wherein selection of the first position scales the thumbnails to be displayed at the target display width and the target display height. The product includes instructions to recalculate the target display width and the target display height whenever the width or the height of the display pane being displayed changes. The product is tangibly stored on machine-readable medium.

The invention can be implemented to realize one or more of the following advantages. A system in accordance with the invention can scale a grid of thumbnails up to a maximum size so that only one thumbnail is displayed in a display pane and the displayed thumbnail is not cropped. Nor is the current aspect ratio of the thumbnail changed.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
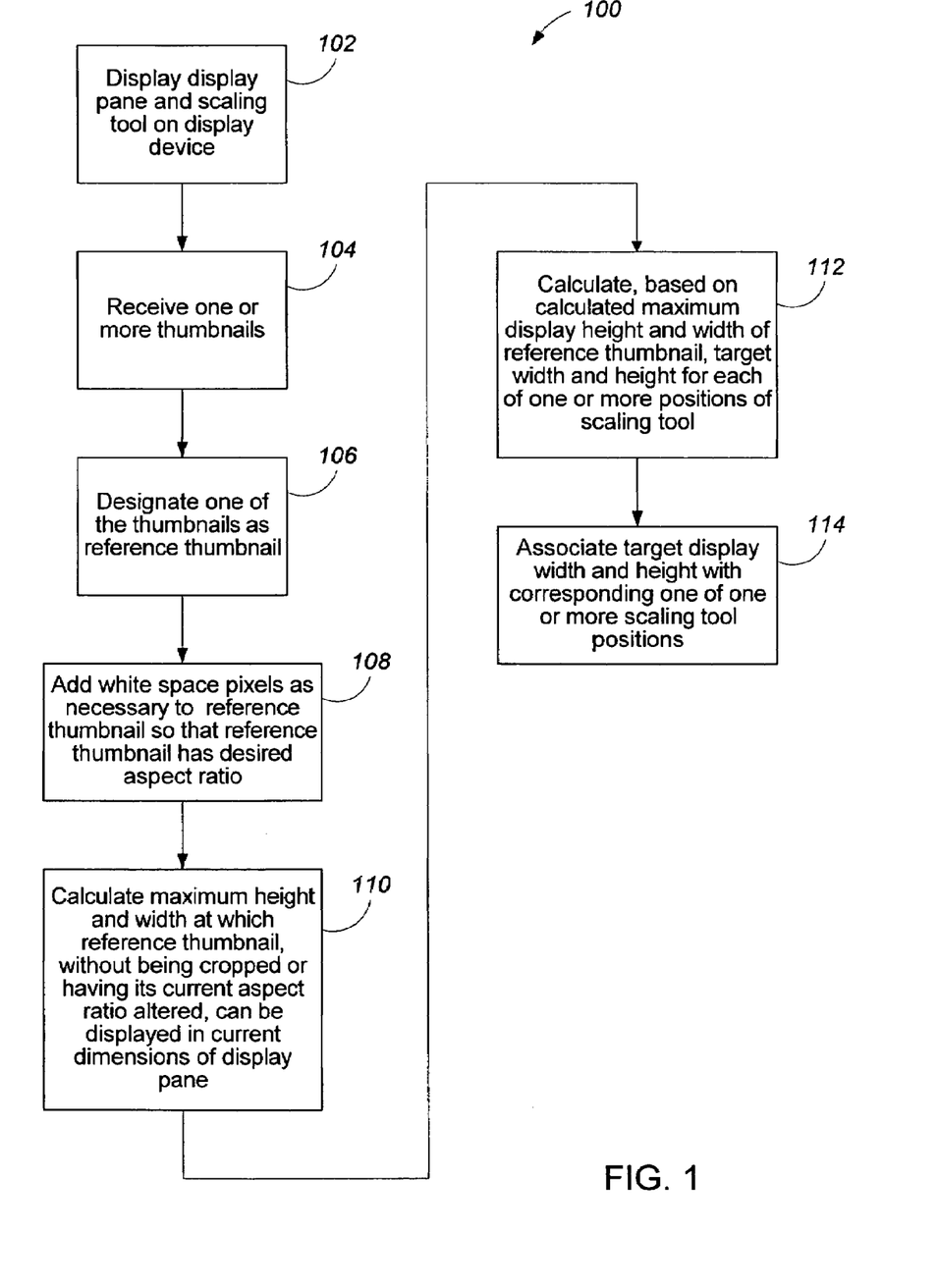
FIG. 1 shows a method for calculating target dimensions for one or more positions of a scaling tool.

FIG. 1 shows a method for calculating target display dimensions (i.e., target display width and target display height) for one or more positions of a scaling tool. An application performing method 100 displays a display pane and a scaling tool on a display device (step 102). The display pane has a current display width and a current display height, for example, 4,000 pixels by 3,000 pixels, in which thumbnails can be displayed. The display pane is subject to resizing, for example, by user action or by constraints of the display device. Resizing can change the current display width of the display pane, its current display height, and/or its aspect ratio. The display device can be a computer monitor, a display of a personal digital assistant, or a display of a digital camera.

The application receives one or more thumbnails (step 104). Receiving can include, for example, retrieving thumbnails that are stored in memory. The thumbnails received can be, for example, those previously generated and stored in persistent memory or, alternatively, those dynamically generated and stored in volatile memory. The thumbnails are static images and may differ from each other in size and/or aspect ratios.

The application designates one of the thumbnails as a reference thumbnail (step 106). If there is a displayed thumbnail that has been selected by user action, then this thumbnail is designated to be the reference thumbnail. If there are displayed thumbnails but none has been selected by user action, the application designates, from among the thumbnails being displayed, the far left thumbnail of the top row to be the reference thumbnail. If there are no thumbnails being displayed, the application designates the first thumbnail received to be the reference thumbnail. Optionally, the scaling is disabled when there are no thumbnails being displayed, in which case there is no reference thumbnail designation.

Figure 2:
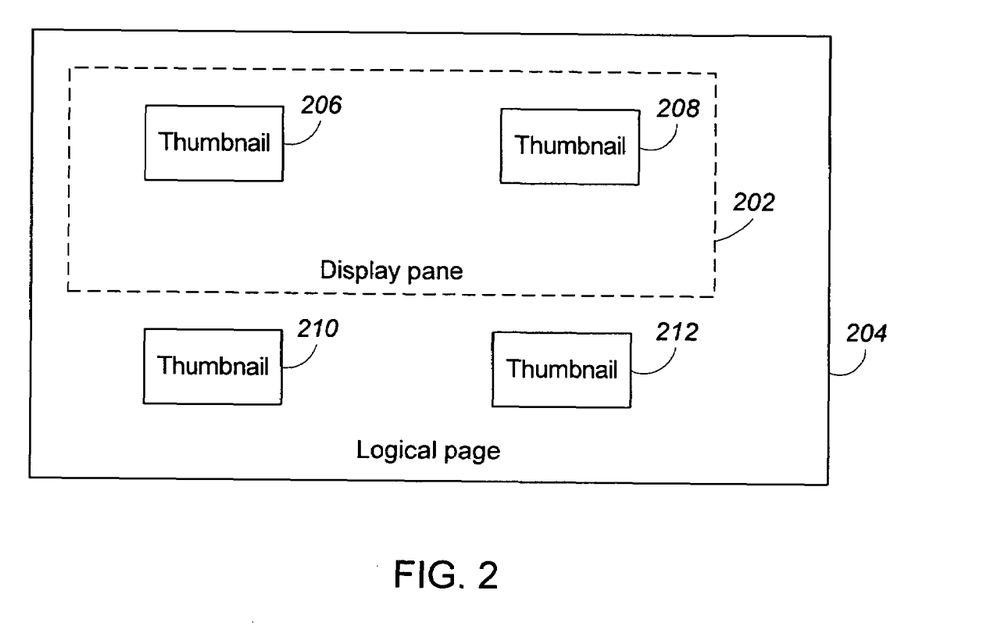
FIG. 2 illustrates a situation in which thumbnails are hidden by scrolling action.

The application usually includes a logical page which the thumbnails are arranged, for example, in a grid. The logical page can exhibit a background color and can be an image. The logical page can have a spatial extent that is greater than that of the display pane, in which case not all of the thumbnails on the logical page are displayed in the display pane. FIG. 2 provides an example. As can be seen, the display pane 202 is smaller in size than the logical page 204, and, because of the position of the display pane relative to the logical page, thumbnails 206 and 208 are displayed while thumbnails 210 and 212 are not. Usually, however, one can scroll the display pane 202 to different areas of the logical page to view thumbnails that are otherwise hidden. For example, one can scroll the display pane 202 to overlie the thumbnail 210 so that the thumbnail 210 will be displayed.

Each thumbnail has an original aspect ratio, which is the aspect ratio the thumbnail had when it was first received by the application. The original aspect ratio can be the same as the inherent aspect ratio of the thumbnail if, for example, the thumbnail has not been changed between the time of its creation and the time when it is received by the application.

Figure 3A:
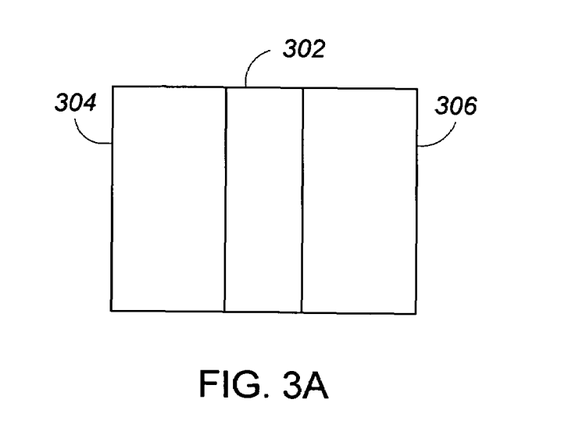
FIG. 3A illustrates how white space pixels are added to obtain a preferred aspect ratio.

Optionally, the application adds white space pixels as necessary to the reference thumbnail so that the reference thumbnail has a desired aspect ratio (step 108 of FIG. 1). White space pixels are pixels that either are completely transparent or have the same color as the background. In the latter case, there is no visual difference between the white space pixel and a background pixel. In one implementation, the desired aspect ratio is 4:3. FIG. 3A illustrates how white space pixels are added to obtain a preferred aspect ratio. The thumbnail 302 is 200 pixels wide and 600 high and, thus, has an aspect ratio of 1:3. The application adds two rectangles 304 and 306 of white space pixels on either side of the thumbnail. Each rectangle is 300 pixels by 600 pixels. The resulting reference thumbnail thus has the preferred aspect ratio of 4:3. Note, however, that the resulting reference thumbnail appears as though it has its original aspect ratio because the non-white space pixels of the thumbnail still have the original aspect ratio.

The application calculates a maximum height and a maximum width at which the reference thumbnail, without being cropped or having its current aspect ratio altered, can be displayed in the current dimensions (i.e., width and height) of the display pane (step 110). The current aspect ratio of the reference thumbnail is the aspect ratio the thumbnail currently has, which is the desired aspect ratio, if step 108 was performed, or otherwise is the thumbnail's original aspect ratio. In calculating the maximum height and the maximum width, the application can account for the display space consumed by other items to be displayed with a thumbnail. When such items are present, there is less display space available to display the thumbnail. Examples of these items include dates, text, and borders.

Figure 3B:
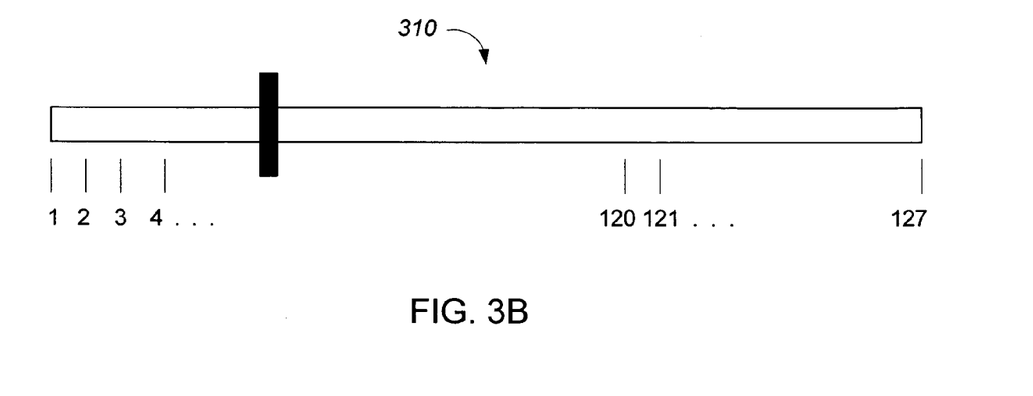
FIG. 3B shows an example of a scaling tool.

The application calculates, based on the calculated maximum display height and the calculated maximum display width of the reference thumbnail, a target display width and a target display height for each of the one or more positions of the scaling tool (step 112). One or more of the positions of the scaling tool positions may be associated with a target display width and a target display height that are fixed. These positions are referred to in the instant specification as fixed positions. The positions for which the associated target display height and target display width are being calculated in the current step are referred to in the instant specification as dynamic positions because their associated values can change dynamically in response to changes, for example, to the current height and width of the display pane. FIG. 3B provides an example of an arrangement of fixed and dynamic scaling positions. The slider 310 has 128 scaling positions, each being selectable by movement of the slider thumb. Positions 0-120 are fixed and 121-128 are dynamic, for example.

To calculate the target display width and target display height, the application uses the maximum display width and maximum display height calculated in step 110 and interpolates between these values and the largest values that are associated with the fixed position (which is position 120 in the above example). In general, the application calculates target dimensions for dynamic positions so that the incremental change in size from one dynamic position to an adjacent dynamic position is substantially constant.

The application associates the target display width and the target display height with the corresponding one of the one or more scaling tool positions (step 114). The application recalculates the target dimensions as described above whenever the current dimensions of the display pane changes.

When the optional step 108 is performed, the dynamic positions have target values that define a same aspect ratio. When this same aspect ratio is also used for the fixed positions, i.e., each of the fixed position has a target display width and a target display height that define this same aspect ratio, all positions of the scaling tool will be associated with the same aspect ratio.

In response to a selection of one of the scaling positions, the application scales all the thumbnails on the background to the target display width and the target display height associated with the selected position. For thumbnails not having an inherent aspect ratio that is the same as the aspect ratio defined by the target display width and height associated with the selected position, the application performs a fitting operation similar to the one described above in reference to step 110, except that instead of using the width and height of the display pane being displayed, the application uses the target display width and the target display height associated with the selected position. The fitting operation, like operation performed in step 110, produces a calculated width and height, to which the application then scales the thumbnail. The application can add white space pixels as described above in reference to step 108 and/or center the thumbnail in the rectangle defined by the dimensions just calculated.

Optionally, the application can limit scaling so that a thumbnail is not scaled so that its displayed size exceeds its inherent size, which is usually determined by the application and/or the device that generated the thumbnails.

Figure 4:
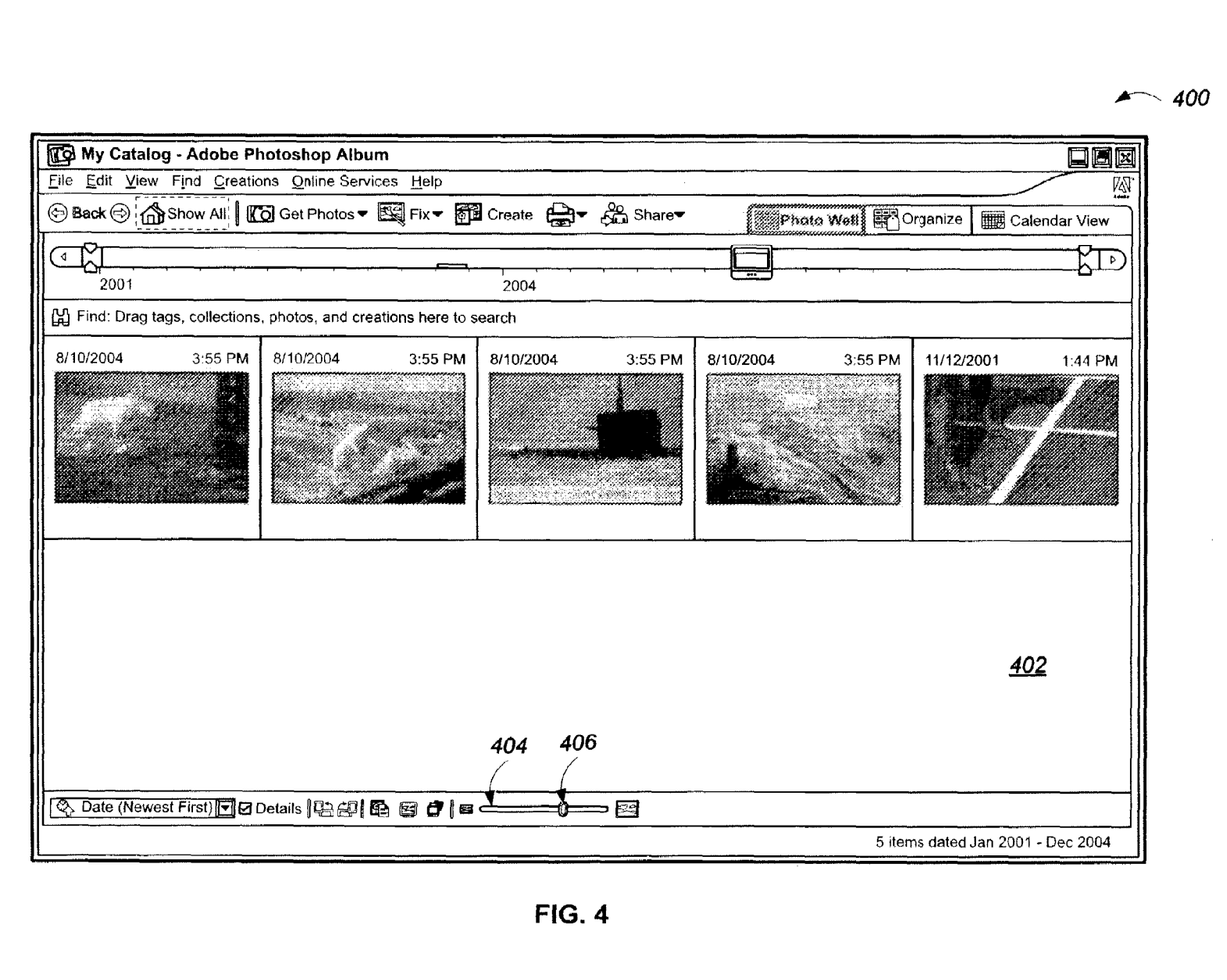
FIG. 4 shows a graphical user interface that includes an image scaling tool in accordance with the invention.

FIG. 4 shows a graphical user interface (GUI) 400 provided by Adobe® Photoshop® Album 2.0, available from Adobe Systems, Incorporated of San Jose, Calif. The GUI 400 includes a display pane 402 and a scaling tool that is a slider 404. The slider 404 includes a slider thumb 406 for selecting slider positions. The GUI 400 also includes a scroll bar 408 for vertical scrolling.

The display pane 402 is subject to resizing. Thumbnails that are displayed in the display pane are reflowed in response to either a resizing of the display pane or movement of the slider thumb 406 that changes the thumbnail size. Reflow of the thumbnails is similar to the reflow of text. Reflow occurs only in response to a change in the width of the display pane. When there is insufficient space along the width of the display pane to display the thumbnails at the target dimensions of the selected slider position, the last thumbnail on a line, i.e., the far right thumbnail, is moved to the next line below, and more lines are added as needed.

The slider 404 has 128 selectable positions, with position 0 on the far left, position 127 on the far right, and positions 1-126 in between the extreme ends of the slider.

Some of the positions are fixed and others are dynamic. For example, positions 0-120 are fixed and form a range on the slider referred to as the fixed range. The values (i.e., target display width and height target display measured in terms of pixels) of each of positions 0-120 progressively increase from position 0 to position 120. The values are generally determined by the display resolution and display pane size. Table 1 shows the target display width for one implementation of the slider. The corresponding target display height of a target display width is calculated by multiplying the target display width by ¾. The target display width and the target display height for position 0 is 60 pixels and 45 pixels, respectively, and the target display width and the target display height for position 120 is 320 pixels and 240 pixels.

TABLE 1

| Position | Target Display Width (pixels) |
|---|---|
| 0 | 60 |
| 1 | 61 |
| 2 | 62 |
| . | . |
| . | . |
| . | . |
| 60 | 120 |
| 61 | 122 |
| 62 | 124 |
| 63 | 126 |
| . | . |
| . | . |
| . | . |
| 80 | 160 |
| 81 | 164 |
| 82 | 168 |
| . | . |
| . | . |
| . | . |
| 120 | 320 |

Positions 121-128 are associated with the values that are dynamically calculated as described above. Positions 121-128 form a range on the slider referred to as the dynamic range. The target dimensions associated with positions 121-128 are at least the size of the target dimensions of position 120. This requirement ensures that thumbnail size does not decrease when the slider thumb is moved from left to right.

Actuation of the slider thumb 406 is effect by moving a cursor over the thumb and then depressing a mouse button, which action holds the thumb so that moving the mouse causes the thumb to move in the corresponding direction. To conserve computing resources, while the thumb is being held, i.e., the mouse button is being depressed, the thumbnails displayed in the display pane are low resolution images that have been cached. When the mouse button is released, the thumbnails are displayed at their normal resolution.

Figure 5:
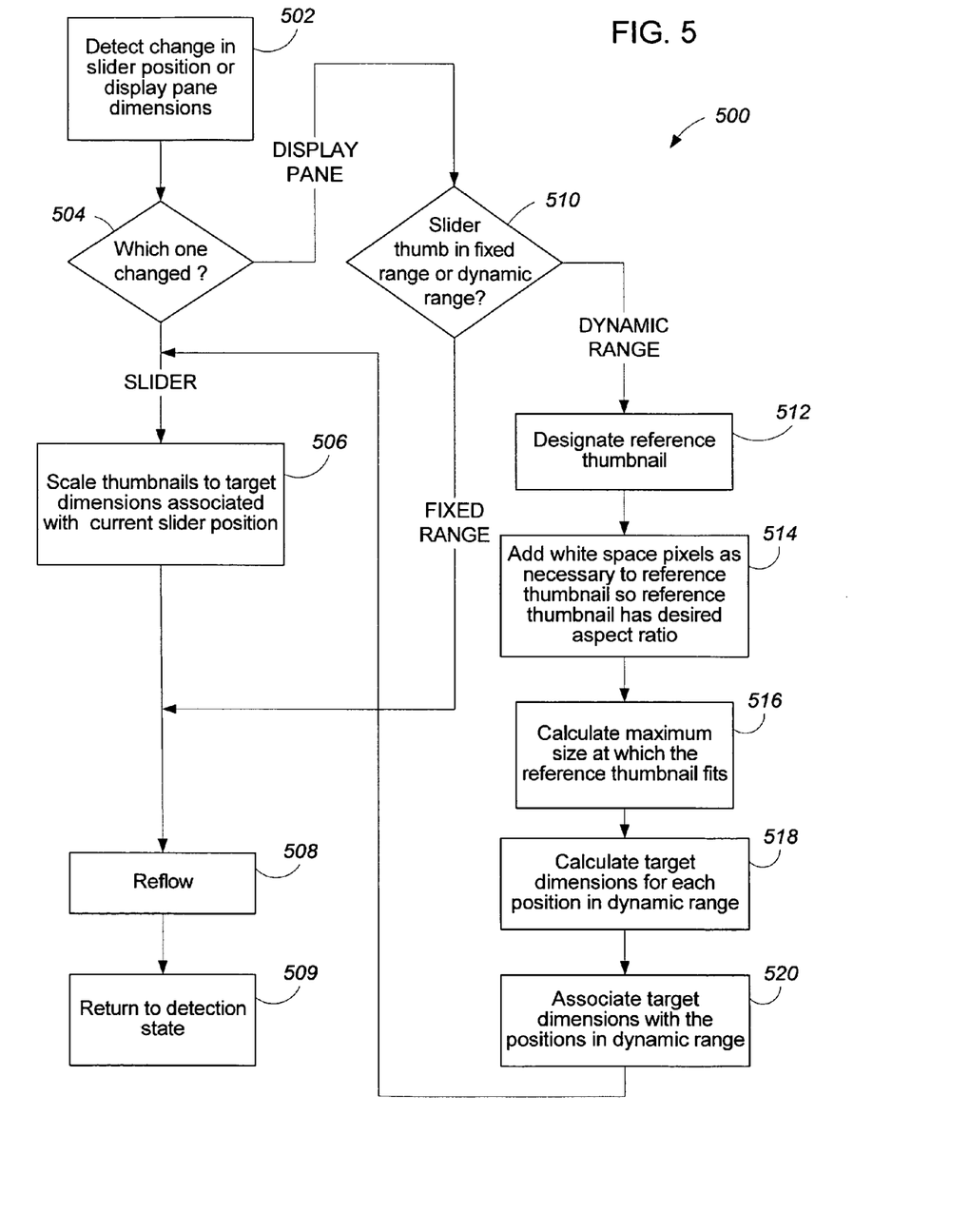
FIG. 5 shows a method for displaying thumbnails.

FIG. 5 shows one method 500 for displaying the thumbnails. A system performing method 500 detects either a change of slider position or a change in the width and height (i.e., dimensions) of display pane (step 502). The system determines whether the slider position was changed or the dimensions of the display pane was changed (step 504). If the slider thumb position was changed, the system scales the thumbnails to the target dimensions associated with the current slider position (step 506). The system reflows the thumbnails as necessary (step 508). The system then returns to a state where it can detect changes in slider position selection and changes in the dimensions of the display pane (step 509). If the dimensions of the display pane was changed, the system determines whether the slider thumb is currently positioned in the fixed range or the dynamic range (step 510). If the slider thumb is in the fixed range, the system proceeds to step 508 and reflows the thumbnails as necessary. If the slider thumb is in the dynamic range, the system proceeds to steps 512, 514, and 516. The system designates a reference thumbnail as described above in reference to step 106 of FIG. 1 (step 512). The system adds white space pixels as necessary to the reference thumbnail so that the reference thumbnail has a desired aspect ratio (step 514), as described in step 108 of FIG. 1. In one implementation, the desired aspect ratio is 4:3. The system calculates the maximum size at which the reference thumbnail, without being cropped or having its aspect ratio changed, can fit in the current dimension of the display pane (step 516). The details of this calculation are provided below in reference to FIG. 6. The system calculates target dimensions for the each position in the dynamic range (step 518). The system need not calculate the target dimension for the extreme left dynamic position because these dimension are the dimension calculated in step 516. The calculated target dimensions are based on the maximum reference thumbnail display width and display height calculated in (step 516). The details of this calculation are provided below in reference to FIG. 7. The system associates the target display widths and display heights with the corresponding positions in the dynamic range (step 520). The system then proceeds to steps 506, 508, and 509.

Figure 6:
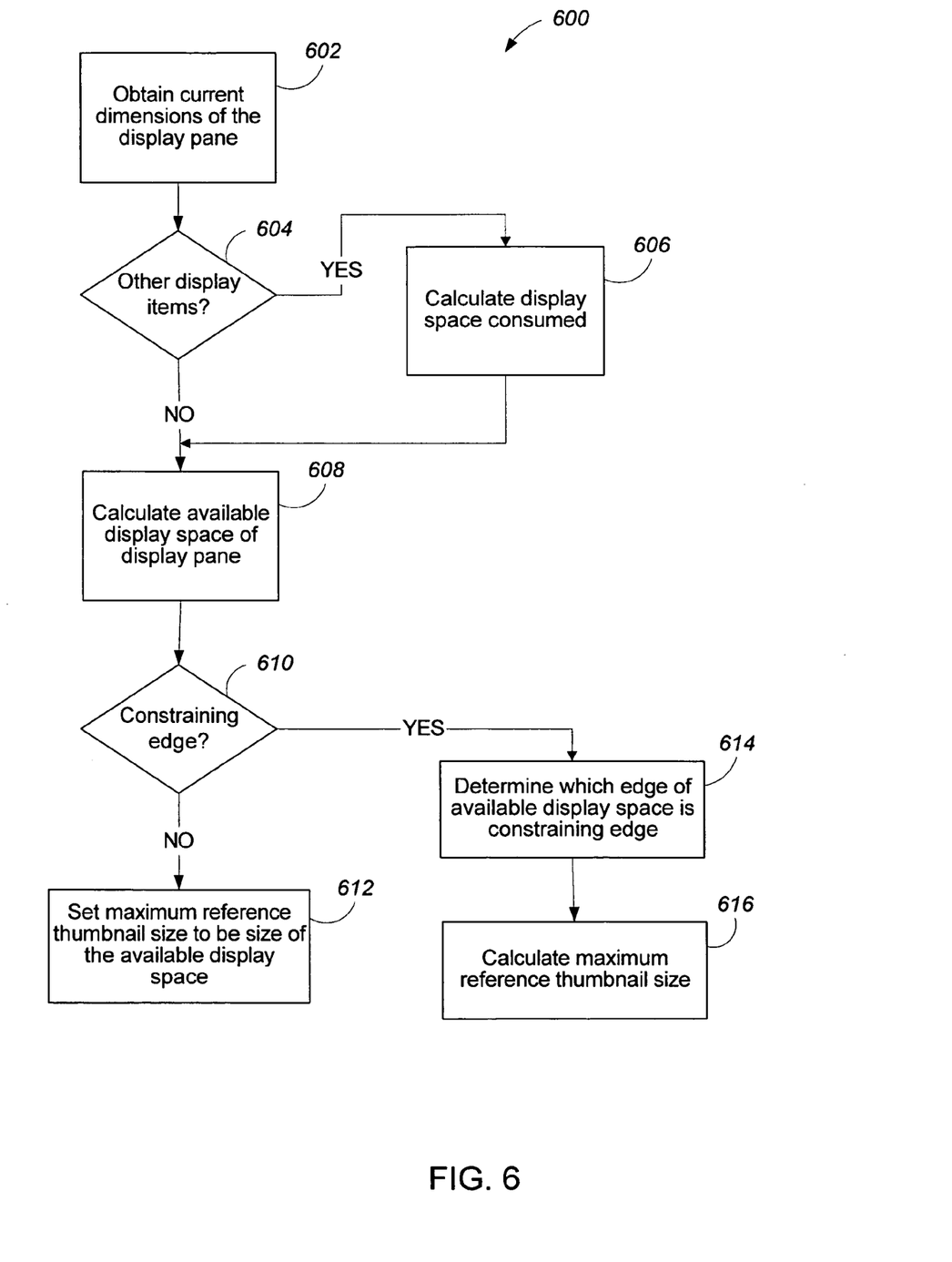
FIG. 6 shows a method for calculating a maximum size of a reference thumbnail.

FIG. 6 shows one method 600 for performing the calculation of step 516. The system obtains the current dimensions of the display pane (step 602). The system determines whether any other items will be displayed with the thumbnail in the display pane (decision step 604). If there are, the system calculates the display space consumed by these items (step 606). Otherwise, the system proceeds to step 608.

The system calculates the available display space of the display pane (step 608). The calculation is based on the display space consumed by the items, if there are any, and their positions relative to the thumbnail.

The system determines whether the available display space has a constraining edge (step 610). A constraining edge is the edge that limits the reference thumbnail, without having its current aspect ratio changed, from being grown larger and still fit in the available display space. To make the determination, the application takes the edges of the available display space and divides each by the corresponding aspect ratio number. Given, for example, a reference thumbnail having an aspect ratio of 4:3 and an available display space that is 960 pixels wide and 360 pixels high, the application divides the width 960 by 4 and the height 360 by 3. If the results are not equal, then there is a constraining edge. Otherwise, there is no constraining edge.

If there is no constraining edge, the system sets the maximum reference thumbnail size to be the size of the available display space (step 612). Otherwise, the system determines which edge of the available display space is the constraining edge (step 614). The constraining edge is the one that yields the smaller result of the division operations described in step 610. In the example given, the height yielded a result of 120 (360 divided by 3) and the width yielded a result of 240 (960 divided by 4). The height of the available display area, in this case, is the constraining edge.

The system calculates the maximum reference thumbnail size (step 616). The system multiplies the smaller result of the division operation, i.e., 120, by the ratio number corresponding to non-constraining edge, i.e., 4. The result of this multiplication, i.e., 480, is the dimension, of the maximum reference thumbnail size, along the non-constraining edge. The dimension of the constraining edge, i.e., 360 pixels, is the other dimension of the maximum reference thumbnail size. Thus, the maximum reference thumbnail size is 480 pixels wide and 360 pixels high.

Figure 7:
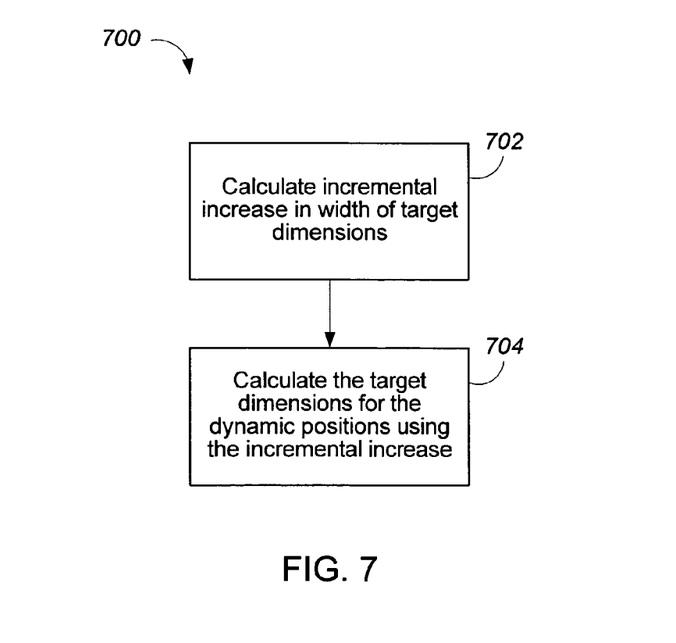
FIG. 7 shows a method for calculating target dimensions.

FIG. 7 shows a method for performing the calculation of step 518. The system calculates the incremental increase in the width of the target dimensions (step 702). The system uses the following equation:

$$x = (\text{Width}_{max\ dyn} - \text{Width}_{max\ fixed})/\text{No. of dynamic positions}$$

where, x is the incremental increase, $\text{Width}_{max\ dyn}$ is the width of the maximum reference thumbnail size calculated in step 516, and $\text{Width}_{max\ fixed}$ is the fixed target display width associated with position 120, the largest scaling fixed position, and No. of dynamic positions is the umber of dynamic positions the slider has, which in the implementation shown in FIG. 4 is seven (positions 121-127). The system calculates the target dimensions for the dynamic positions (step 704). For each dynamic position, the system calculates the target width by using the following equation:

$$\text{width} = 320 + (x \cdot n)$$

where, n is 1 for position 121, 2 for potion 122, . . . , and 6 for position 126. The system rounds the result to the nearest multiple of 16. The system calculates the target height by using the following equation:

$$\text{height} = \text{width}/\text{desired aspect ratio}$$

$$\text{height} = \text{width} \cdot \tfrac{3}{4}$$

The system can implement cells of the display pane when displaying thumbnails. For a given slider position, reference thumbnail, and window dimension, the cells have a uniform size and aspect ratio. To calculate cell dimensions, the system takes the target dimensions associated with the currently selected slider position and adds on spacing as needed to allow a thumbnail and any items to be displayed with the thumbnail to fit inside the cell. Cells can have borders that distinguish the contents of one cell from neighboring cells. The thumbnail of a cell is displayed in the center of the cell.

Figure 8:
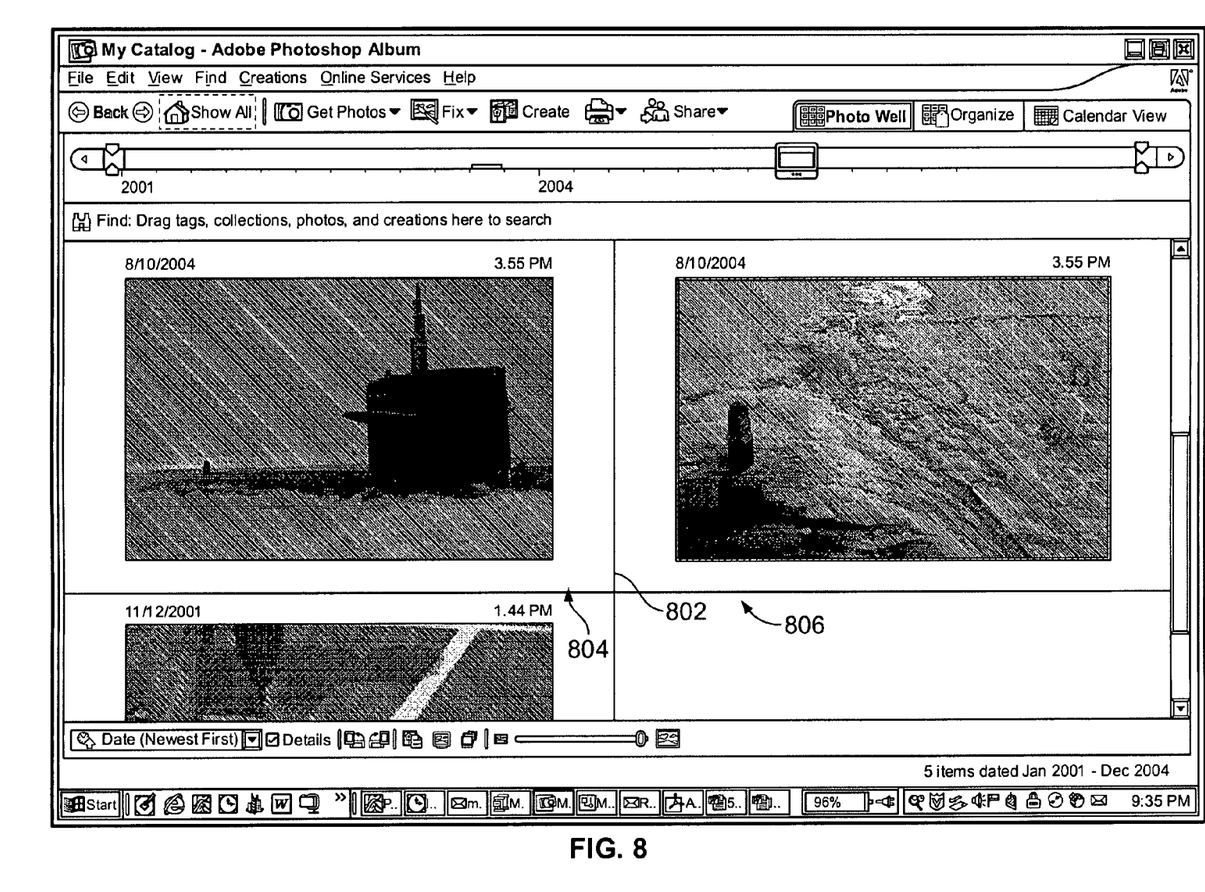
FIGS. 8 and 9 provide example of display pane cells.
Figure 9:
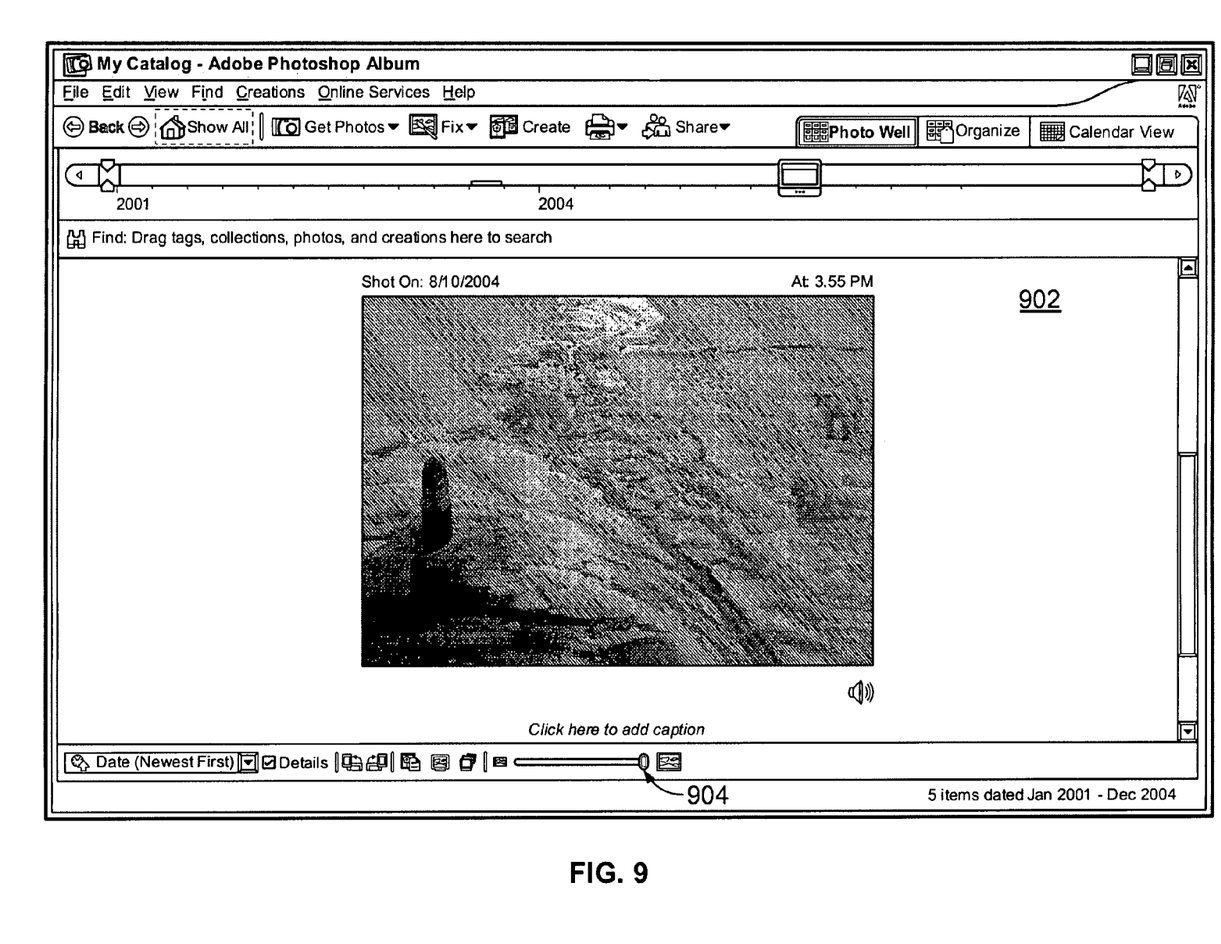

FIGS. 8 and 9 provide examples of cells. As can be see, cells 804 and 806 include their respective thumbnails, dates, and times. Border 802 vertically separates cells 804 and 806. Cells can facilitate thumbnail selection. Pointing and clicking, with an input device such as a mouse, at any point in the cell, and not just at points over the thumbnail in the cell, will select the thumbnail.

In FIG. 9, there is only one cell displayed, and it has the dimensions of the display pane 902. The slider thumb 904 is positioned at the far right position, i.e., position 127, which scales the thumbnails so that only the reference thumbnail is being displayed in the display pane. The reference thumbnail is being displayed at a maximum size at which the reference thumbnail, without being cropped or having its aspect ratio changed, fits into the display pane.

Figure 10:
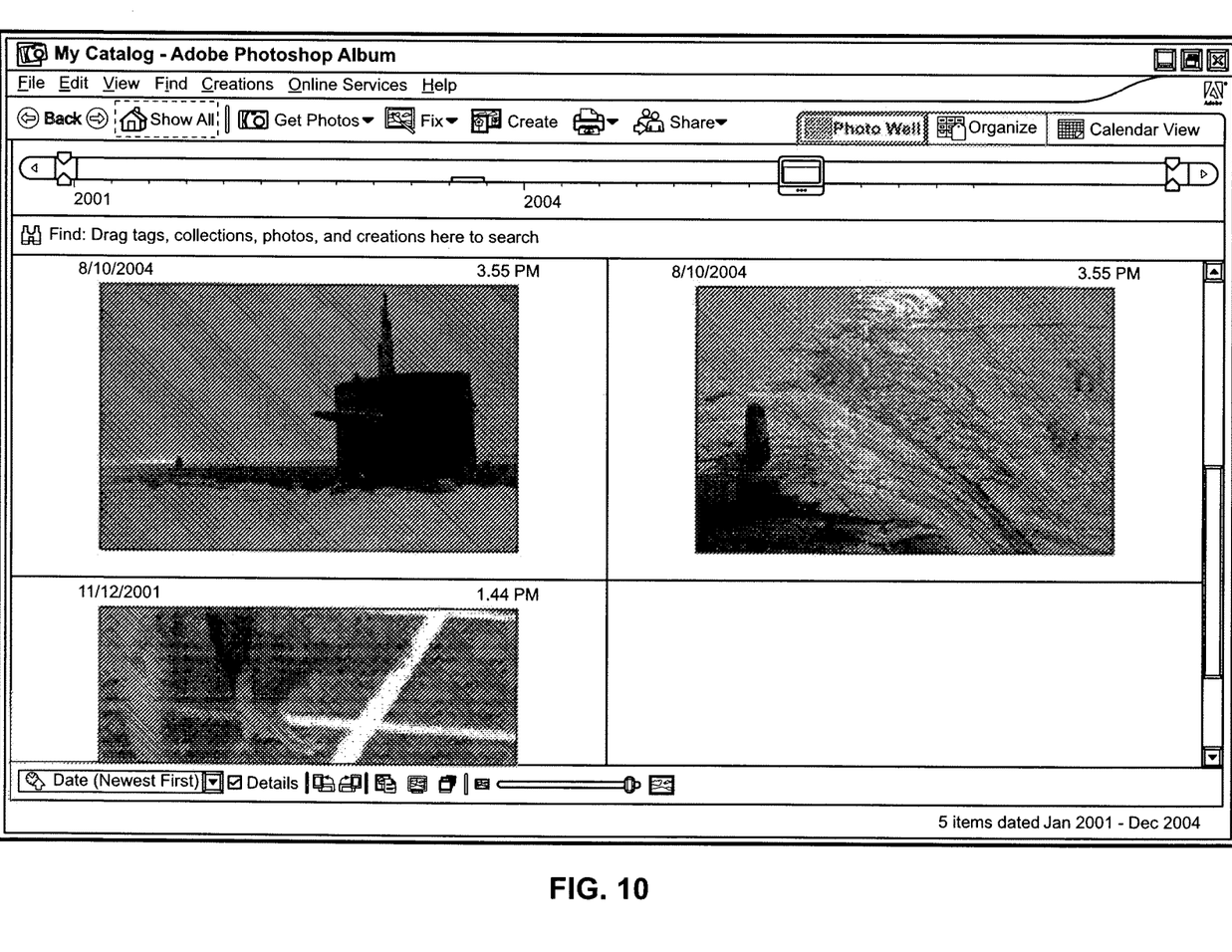
FIGS. 10 and 11 illustrate a short-cut tool for scaling thumbnails.
Figure 11:
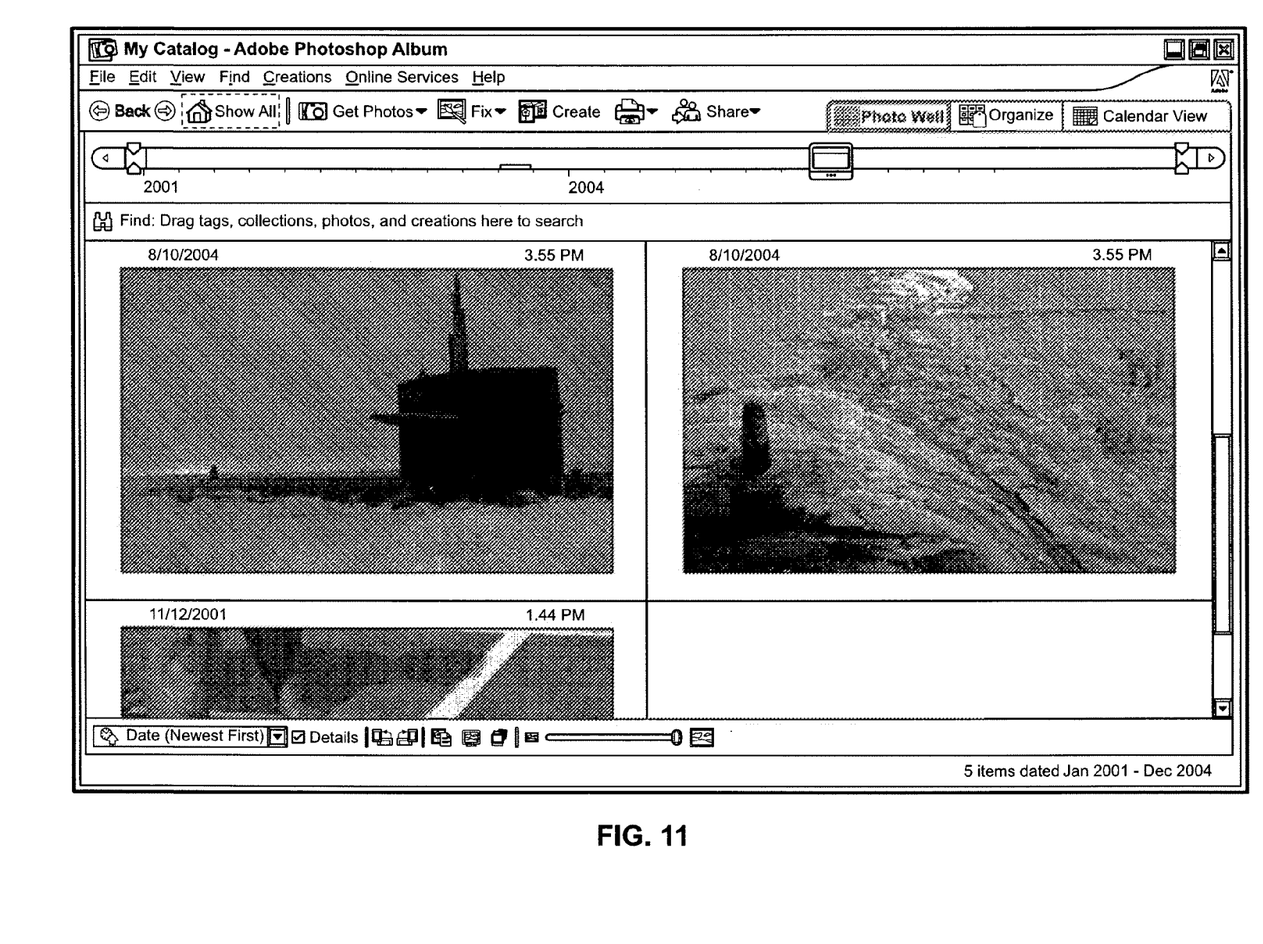

The system implements a short-key tool that, in response to user request, determines which position of the scaling tool will scale the thumbnails to a maximum size at which a particular number of thumbnails can be displayed within the width of the display pane, and automatically selects the position. The particular number of thumbnails is the number of thumbnails currently being displayed in across the width of the display pane. Actuating the short-key tool, simply locates the slider positions in which the thumbnails in a line (i.e., across the width of the display pane) are at their largest size without having the far right thumbnail being reflowed to the line below. FIGS. 10 and 11 illustrate the effect of actuating the short-key tool. In FIG. 10, there are two thumbnails in a line. However, these thumbnails are not at the largest size at which they are not reflowed. FIG. 11 shows the thumbnails after the short-key tool was actuated. As can be seen, the number of white spacing that borders in a cell is reduced.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results. The functionalities described above for horizontal dimensions can be, alternatively, applied to vertical dimensions and, vice versa, functionalities for vertical dimensions can be applied to horizontal dimensions. These functionalities can also be applied to thumbnails that reference objects having dynamic content, for example, video clips, multiple page documents, and calendar dates. These functionalities can be applied to images other than thumbnails.

What is claimed is:

1. A computer-implemented method, comprising:
    displaying a display pane and an image scaling tool on a display device, the display pane being subject to resizing and displayed at a current width and a current height, the image scaling tool having two or more selectable positions;
    receiving one or more thumbnails;
    designating one of the one or more thumbnails to be a reference thumbnail, the reference thumbnail being an image having a particular aspect ratio;
    calculating a maximum display width and maximum display height at which the reference thumbnail, without being cropped or having its particular aspect ratio altered, can fit in the display pane being displayed;
    calculating, for a first of the two or more selectable positions of the image scaling tool, a target display width and a target display height, the calculation being based on the maximum display width and maximum display height of the reference thumbnail;
    associating the target display width and the target display height with the first position, wherein selection of the first position scales the thumbnails to be displayed at the target display width and the target display height; and
    recalculating the target display width and the target display height whenever the width or the height of the display pane being displayed changes.

2. The method of claim 1, further comprising:
    recalculating the target display width and the target display height whenever another of the one or more thumbnails is designated as the reference thumbnail.

3. The method of claim 1, further comprising:
    selecting the first position; and
    rescaling the thumbnails whenever the target display width and the target display height associated with the first position changes.

4. The method of claim 1, further comprising:
    whenever another of the thumbnails is designated as the reference thumbnail, recalculating a maximum display width and maximum display height at which the reference thumbnail, without being cropped or having its aspect ratio altered, can fit in the display pane, and recalculating the target display width and the target display height based on the recalculated maximum display width and the maximum display height of the reference thumbnail.

5. The method of claim 1, wherein calculating the target display width and the target display height includes:
    determining whether the maximum display width and the maximum display height of the reference thumbnail is less than a threshold width and a threshold height, respectively;
    if it is determined that either the maximum display width is less than the threshold width or the maximum display height is less than the threshold height, using the threshold width and the threshold height as the target display width and the target display height, respectively, whereby selection of the first position results in the reference thumbnail being scaled to a maximum display width and a maximum display height at which the thumbnail, without being cropped or have its particular aspect ratio changed, can fit into a rectangular area defined by the threshold width and the threshold height.

6. The method of claim 1, wherein one or more but not all of the positions of the scaling tool have associated values that are fixed, the method further comprising:
    for each position having an associated value that is dynamically calculated other than the first position, calculating a target display width and a target display height, the calculation being based on the maximum display width and the maximum display height of the reference thumbnail, associating the target display width and the target display height with the position, wherein selection of the position scales each of the thumbnails to a maximum display width and a maximum display height at which the thumbnail, without being cropped or have its particular aspect ratio changed, can fit into a rectangular area defined by the target display width and the target display height, and recalculating the target display width and the target display height whenever either the current width and the current height of the display pane changes or whenever another of the thumbnails is designated as the reference thumbnail.

7. The method of claim 6, wherein one of the positions not having an associated value that is fixed is a maximum scaling position and that is associated with the maximum display width and the maximum display height of the reference thumbnail, the method further comprising:

displaying the thumbnails so that the reference thumbnail is the only one of the thumbnails to be actually displayed in the window pane whenever the maximum scaling position is selected.

8. The method of claim 7, wherein:

the image scaling tool comprises a slider that has 128 positions, position 1 being a minimum scaling position, a selection of which scales the thumbnails to their smallest sizes, position 128 being the maximum scaling position;

each of positions 1-120 is associated with a fixed target display width and a fixed target display height; and each of positions 121-128 is associated with a target display width and a target display height that are dynamically calculated based on the current width and height of the display pane and the maximum display width and the maximum display height of the reference thumbnail, wherein selection of any of positions 121-128 results in a reference thumbnail size that is at least the same size as the reference thumbnail size resulting from a selection of position 121.

9. The method of claim 1, further comprising:

in response to user request, determining which position of the scaling tool will scale the thumbnails to a maximum size at which a particular number of thumbnails can be displayed within one of the display dimensions, and automatically selecting the position.

10. The method of claim 1, wherein:

selecting a thumbnail includes selecting one of a default thumbnail, a user selected thumbnail currently being displayed in the display pane, or a top left thumbnail currently being displayed in the display pane.

11. A computer-program product, tangibly stored on machine-readable medium, comprising instructions operable to cause a processor to:

display a display pane and an image scaling tool on a display device, the display pane being subject to resizing and displayed at a current width and a current height, the image scaling tool having two or more selectable positions;

receive one or more thumbnails;

designate one of the one or more thumbnails to be a reference thumbnail, the reference thumbnail being an image having a particular aspect ratio;

calculate a maximum display width and maximum display height at which the reference thumbnail, without being cropped or having its particular aspect ratio altered, can fit in the display pane being displayed;

calculate, for a first of the two or more selectable positions of the image scaling tool, a target display width and a target display height, the calculation being based on the maximum display width and maximum display height of the reference thumbnail;

associate the target display width and the target display height with the first position, wherein selection of the first position scales the thumbnails to be displayed at the target display width and the target display height; and recalculate the target display width and the target display height whenever the width or the height of the display pane being displayed changes.

12. The product of claim 11, further comprising instructions to:

recalculate the target display width and the target display height whenever another of the one or more thumbnails is designated as the reference thumbnail.

13. The product of claim 11, further comprising instructions to:

select the first position; and rescale the thumbnails whenever the target display width and the target display height associated with the first position changes.

14. The product of claim 11, further comprising instructions to:

whenever another of the thumbnails is designated as the reference thumbnail, recalculate a maximum display width and maximum display height at which the reference thumbnail, without being cropped or having its aspect ratio altered, can fit in the display pane, and recalculate the target display width and the target display height based on the recalculated maximum display width and the maximum display height of the reference thumbnail.

15. The product of claim 11, wherein instructions to calculate the target display width and the target display height includes instructions to:

determine whether the maximum display width and the maximum display height of the reference thumbnail is less than a threshold width and a threshold height, respectively;

if it is determined that either the maximum display width is less than the threshold width or the maximum display height is less than the threshold height, use the threshold width and the threshold height as the target display width and the target display height, respectively, whereby selection of the first position results in the reference thumbnail being scaled to a maximum display width and a maximum display height at which the thumbnail, without being cropped or have its particular aspect ratio changed, can fit into a rectangular area defined by the threshold width and the threshold height.

16. The product of claim 11, wherein one or more but not all of the positions of the scaling tool have associated values that are fixed, the product further comprising instructions to:

for each position having an associated value that is dynamically calculated other than the first position, calculate a target display width and a target display height, the calculation being based on the maximum display width and the maximum display height of the reference thumbnail, associate the target display width and the target display height with the position, wherein selection of the position scales each of the thumbnails to a maximum display width and a maximum display height at which the thumbnail, without being cropped or have its particular aspect ratio changed, can fit into a rectangular area defined by the target display width and the target display height, and recalculate the target display width and the target display height whenever either the current width and the current height of the display pane changes or whenever another of the thumbnails is designated as the reference thumbnail.

17. The product of claim 16, wherein one of the positions not having an associated value that is fixed is a maximum scaling position and that is associated with the maximum display width and the maximum display height of the reference thumbnail, the product further comprising instructions to:

display the thumbnails so that the reference thumbnail is the only one of the thumbnails to be actually displayed in the window pane whenever the maximum scaling position is selected.

18. The product of claim 17, wherein:
the image scaling tool comprises a slider that has 128 positions, position 1 being a minimum scaling position, a selection of which scales the thumbnails to their smallest sizes, position 128 being the maximum scaling position;
each of positions 1-120 is associated with a fixed target display width and a fixed target display height; and
each of positions 121-128 is associated with a target display width and a target display height that are dynamically calculated based on the current width and height of the display pane and the maximum display width and the maximum display height of the reference thumbnail, wherein selection of any of positions 121-128 results in a reference thumbnail size that is at least the same size as the reference thumbnail size resulting from a selection of position 121.

19. The product of claim 11, further comprising instructions to:
in response to user request, determine which position of the scaling tool will scale the thumbnails to a maximum size at which a particular number of thumbnails can be displayed within one of the display dimensions, and automatically selecting the position.

20. The product of claim 11, further comprising instructions to:
select one of a default thumbnail, a user selected thumbnail currently being displayed in the display pane, or a top left thumbnail currently being displayed in the display pane.

21. A system comprising:
a display device; and
one or more processors operable to interact with the user interface device and to perform operations comprising:
displaying a display pane and an image scaling tool on the display device, the display pane being subject to resizing and displayed at a current width and a current height, the image scaling tool having two or more selectable positions;
receiving one or more thumbnails;
designating one of the one or more thumbnails to be a reference thumbnail, the reference thumbnail being an image having a particular aspect ratio;
calculating a maximum display width and maximum display height at which the reference thumbnail, without being cropped or having its particular aspect ratio altered, can fit in the display pane being displayed;
calculating, for a first of the two or more selectable positions of the image scaling tool, a target display width and a target display height, the calculation being based on the maximum display width and maximum display height of the reference thumbnail;
associating the target display width and the target display height with the first position, wherein selection of the first position scales the thumbnails to be displayed at the target display width and the target display height; and
recalculating the target display width and the target display height whenever the width or the height of the display pane being displayed changes.

22. The system of claim 21, where the processors are further operable to perform operations comprising:
recalculating the target display width and the target display height whenever another of the one or more thumbnails is designated as the reference thumbnail.

23. The system of claim 21, where the processors are further operable to perform operations comprising:
selecting the first position; and
rescaling the thumbnails whenever the target display width and the target display height associated with the first position changes.

24. The system of claim 21, where the processors are further operable to perform operations comprising:
whenever another of the thumbnails is designated as the reference thumbnail, recalculating a maximum display width and maximum display height at which the reference thumbnail, without being cropped or having its aspect ratio altered, can fit in the display pane, and recalculating the target display width and the target display height based on the recalculated maximum display width and the maximum display height of the reference thumbnail.

25. The system of claim 21, wherein calculating the target display width and the target display height includes:
determining whether the maximum display width and the maximum display height of the reference thumbnail is less than a threshold width and a threshold height, respectively;
if it is determined that either the maximum display width is less than the threshold width or the maximum display height is less than the threshold height, using the threshold width and the threshold height as the target display width and the target display height, respectively, whereby selection of the first position results in the reference thumbnail being scaled to a maximum display width and a maximum display height at which the thumbnail, without being cropped or have its particular aspect ratio changed, can fit into a rectangular area defined by the threshold width and the threshold height.

26. The system of claim 21, wherein one or more but not all of the positions of the scaling tool have associated values that are fixed, where the processors are further operable to perform operations comprising:
for each position having an associated value that is dynamically calculated other than the first position, calculating a target display width and a target display height, the calculation being based on the maximum display width and the maximum display height of the reference thumbnail, associating the target display width and the target display height with the position, wherein selection of the position scales each of the thumbnails to a maximum display width and a maximum display height at which the thumbnail, without being cropped or have its particular aspect ratio changed, can fit into a rectangular area defined by the target display width and the target display height, and recalculating the target display width and the target display height whenever either the current width and the current height of the display pane changes or whenever another of the thumbnails is designated as the reference thumbnail.

27. The system of claim 26, wherein one of the positions not having an associated value that is fixed is a maximum scaling position and that is associated with the maximum display width and the maximum display height of the reference thumbnail, where the processors are further operable to perform operations comprising:
displaying the thumbnails so that the reference thumbnail is the only one of the thumbnails to be actually displayed in the window pane whenever the maximum scaling position is selected.

28. The system of claim 27, wherein:
the image scaling tool comprises a slider that has 128 positions, position 1 being a minimum scaling position, a selection of which scales the thumbnails to their smallest sizes, position 128 being the maximum scaling position;

each of positions 1-120 is associated with a fixed target display width and a fixed target display height; and each of positions 121-128 is associated with a target display width and a target display height that are dynamically calculated based on the current width and height of the display pane and the maximum display width and the maximum display height of the reference thumbnail, wherein selection of any of positions 121-128 results in a reference thumbnail size that is at least the same size as the reference thumbnail size resulting from a selection of position 121.

29. The system of claim 21, where the processors are further operable to perform operations comprising:

in response to user request, determining which position of the scaling tool will scale the thumbnails to a maximum size at which a particular number of thumbnails can be displayed within one of the display dimensions, and automatically selecting the position.

30. The system of claim 21, wherein:

selecting a thumbnail includes selecting one of a default thumbnail, a user selected thumbnail currently being displayed in the display pane, or a top left thumbnail currently being displayed in the display pane.

\* \* \* \* \*

UNITED STATES PATENT AND TRADEMARK OFFICE
CERTIFICATE OF CORRECTION

PATENT NO. : 7,391,423 B1 Page 1 of 1
APPLICATION NO. : 10/960636
DATED : June 24, 2008
INVENTOR(S) : Johnnie B. Manzari and Claire Schendel It is certified that error appears in the above-identified patent and that said Letters Patent is hereby corrected as shown below:

Claim 3:
    column 10, line 14:
        delete "resealing", and replace with --rescaling--

Signed and Sealed this

Fifth Day of May, 2009

JOHN DOLL
*Acting Director of the United States Patent and Trademark Office*